United States Patent
Wang

(10) Patent No.: US 8,374,454 B2
(45) Date of Patent: Feb. 12, 2013

(54) DETECTION OF OBJECTS USING RANGE INFORMATION

(75) Inventor: Sen Wang, Rchester, NY (US)

(73) Assignee: Eastman Kodak Company, Rochester, NY (US)

(*) Notice: Subject to any disclaimer, the term of this patent is extended or adjusted under 35 U.S.C. 154(b) by 835 days.

(21) Appl. No.: 12/510,431

(22) Filed: Jul. 28, 2009

(65) Prior Publication Data

US 2011/0026764 A1 Feb. 3, 2011
US 2012/0057745 A9 Mar. 8, 2012

(51) Int. Cl.
*G06K 9/42* (2006.01)
*G06K 9/44* (2006.01)
*G06K 9/62* (2006.01)
*G06K 9/68* (2006.01)
*G06K 9/00* (2006.01)

(52) U.S. Cl. ........ 382/256; 382/224; 382/225; 382/218; 382/103

(58) Field of Classification Search .................. None
See application file for complete search history.

(56) References Cited

U.S. PATENT DOCUMENTS

| | | | |
|---|---|---|---|
| 6,252,976 B1 | 6/2001 | Schildkraut et al. | |
| 6,873,723 B1 * | 3/2005 | Aucsmith et al. | 382/154 |
| 6,873,743 B2 | 3/2005 | Steinberg | |
| 7,230,538 B2 | 6/2007 | Lai et al. | |
| 7,421,149 B2 | 9/2008 | Haynes et al. | |
| 7,421,418 B2 | 9/2008 | Nakano | |
| 7,526,127 B2 | 4/2009 | Koide et al. | |
| 7,689,021 B2 * | 3/2010 | Shekhar et al. | 382/131 |
| 2002/0126893 A1 | 9/2002 | Held et al. | |
| 2003/0007687 A1 | 1/2003 | Nesterov et al. | |
| 2003/0044063 A1 | 3/2003 | Meckes et al. | |
| 2003/0044070 A1 | 3/2003 | Fuersich et al. | |
| 2003/0044178 A1 | 3/2003 | Oberhardt et al. | |
| 2003/0223622 A1 | 12/2003 | Simon et al. | |
| 2004/0240749 A1 | 12/2004 | Miwa et al. | |
| 2005/0157204 A1 | 7/2005 | Marks | |
| 2007/0121094 A1 | 5/2007 | Gallagher et al. | |
| 2007/0274604 A1 | 11/2007 | Schechner et al. | |

FOREIGN PATENT DOCUMENTS

WO WO 2008/102296 A2 8/2008
WO WO 2009/072070 A1 6/2009

OTHER PUBLICATIONS

A. Hoover et al.: "An Experimental Comparison of Range Image Segmentation Algorithms", IEEE Transactions on Pattern Analysis and Machine Intelligence, IEEE Service Center, Los Alamitos, CA, US LNKD-DOI:10.1109/34.506791, vol. 18, No. 7, Jul. 1, 1996, pp. 673-689, XP002213073, ISSN: 0162-8828, p. 674; Table 1.

(Continued)

*Primary Examiner* — Tom Y Lu
*Assistant Examiner* — Thomas Conway
(74) *Attorney, Agent, or Firm* — Kevin E. Spaulding

(57) ABSTRACT

A system and method for detecting objects and background in digital images using range information includes receiving the digital image representing a scene; identifying range information associated with the digital image and including distances of pixels in the scene from a known reference location; generating a cluster map based at least upon an analysis of the range information and the digital image, the cluster map grouping pixels of the digital image by their distances from a viewpoint; identifying objects in the digital image based at least upon an analysis of the cluster map and the digital image; and storing an indication of the identified objects in a processor-accessible memory system.

15 Claims, 4 Drawing Sheets

OTHER PUBLICATIONS

"Dominant Sets and Pairwise Clustering", by Massimiliano Pavan et al., IEEE Transactions on Pattern Analysis & Machine Intelligence, vol. 29, No. 1, Jan. 2007, pp. 167-172.

"Object Detection using a Max-Margin Hough Transform" by S. Maji et al., Proc. IEEE Conf. on Computer Vision and Pattern Recognition, 2009.

"Object-Specific Figure-Ground Segregation" by S. X. Yu, et al., Proc. IEE Conf. on Computer Vision and Pattern Recognition, 2003.

"Object Segmentation Using Graph Cuts Based Active Contours" by N. Xu et al., Proc. IEEE Conf. on Computer Vision and Pattern Recognition, 2003.

* cited by examiner

DETECTION OF OBJECTS USING RANGE INFORMATION

FIELD OF THE INVENTION

This invention relates to categorizing digital content records, such as digital still images or video. In particular, this invention pertains to categorizing digital content records based at least upon a method to detect objects and background in a digital image or video using the ranging information.

BACKGROUND OF THE INVENTION

In many imaging system applications, it is desirable to detect objects in digital images. For example, face detection is used for security applications or for setting capture conditions on a digital camera to optimize image quality for the people in a captured digital image.

There are many prior art references that describe the detection of objects. However, the majority only use information from two-dimensional (2D) digital images. For example, a method of object detection utilizing a cell network is described in U.S. Pat. No. 7,526,127.

With the development of ranging capture devices, it is very easy to get range information during the capture of a digital image. The range information can provide extra information that can be used to improve the detections of objects in the digital image. U.S. Patent Application Publication No. 2007/0121094 teaches an object detection method focused on face detection that uses range information to increase the accuracy of detection. However, the face detection algorithm that is described makes many errors by either not detecting an actual face, or by detecting a false face.

A need exists for a method to robustly detect and segment objects and background in a digital image or video taking advantage of the range information.

SUMMARY OF THE INVENTION

The present invention represents a method for detecting objects and background in a digital image, and the method implemented at least in part by a data processing system and comprising the steps of:

receiving the digital image representing a scene;
identifying range information associated with the digital image, the range information including distances of pixels in the scene from a known reference location;
generating a cluster map based at least upon an analysis of the range information and the digital image, the cluster map grouping pixels of the digital image by their distances from a viewpoint;
identifying objects in the digital image based at least upon an analysis of the cluster map and the digital image; and
storing an indication of the identified objects in a processor-accessible memory system.

It is an advantage of the present invention that by using range information objects can be detected and segmented with improved accuracy.

BRIEF DESCRIPTION OF THE DRAWINGS

The present invention will be more readily understood from the detailed description of exemplary embodiments presented below considered in conjunction with the attached drawings, of which.

DETAILED DESCRIPTION OF THE INVENTION

The present invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

The phrase, "digital content record", as used herein, refers to any digital content record, such as a digital still image, a digital audio file, a digital video file, etc.

It should be noted that, unless otherwise explicitly noted or required by context, the word "or" is used in this disclosure in a non-exclusive sense.

Figure 1:
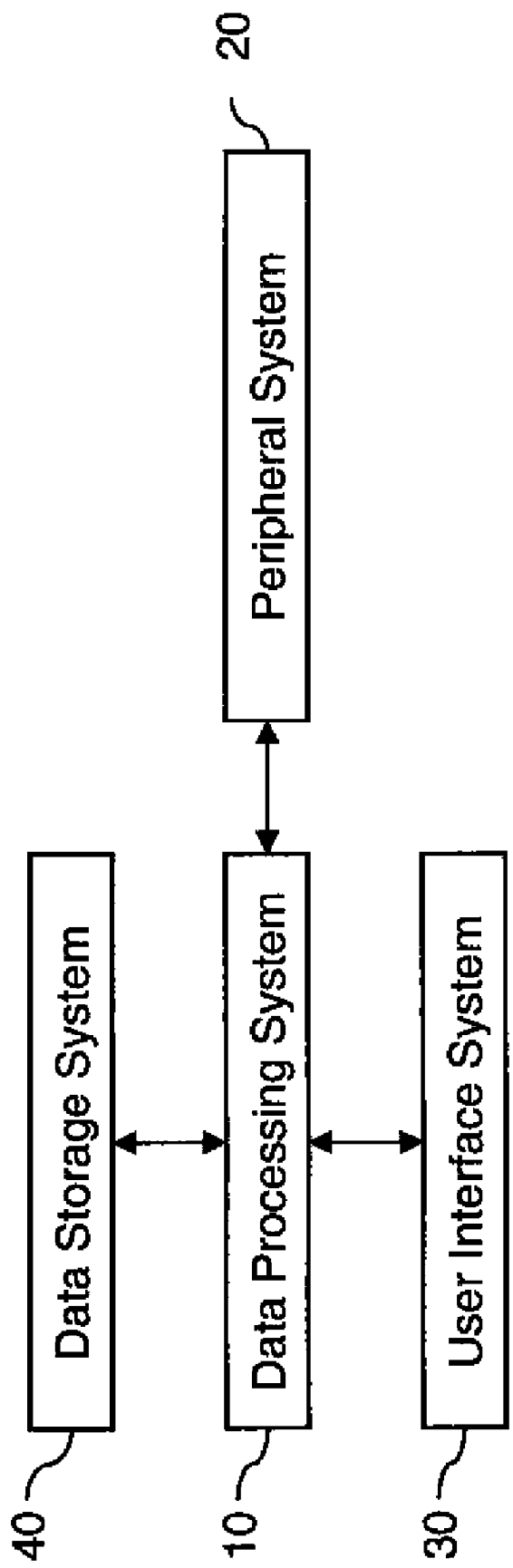
FIG. 1 is a high-level diagram showing the components of a system for detecting objects and background in a digital image according to an embodiment of the present invention.

FIG. 1 is a high-level diagram showing the components of a system for detecting objects and background in a digital image according to an embodiment of the present invention. The system includes a data processing system 10, a peripheral system 20, a user interface system 30, and a data storage system 40. The peripheral system 20, the user interface system 30 and the data storage system 40 are communicatively connected to the data processing system 10.

Figure 2:
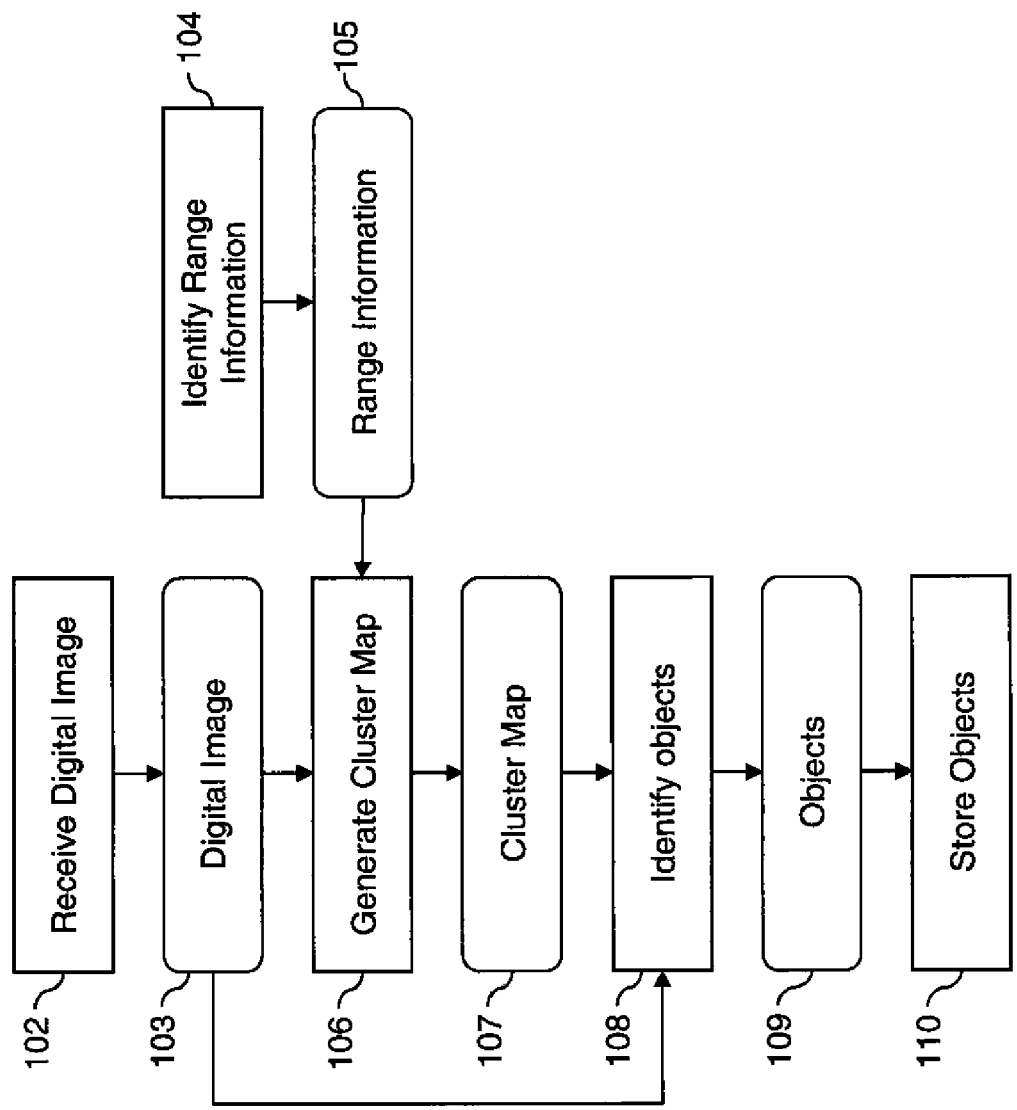
FIG. 2 is a flowchart illustrating a method for detecting objects and background in a digital image, according to an embodiment of the present invention.
Figure 3:
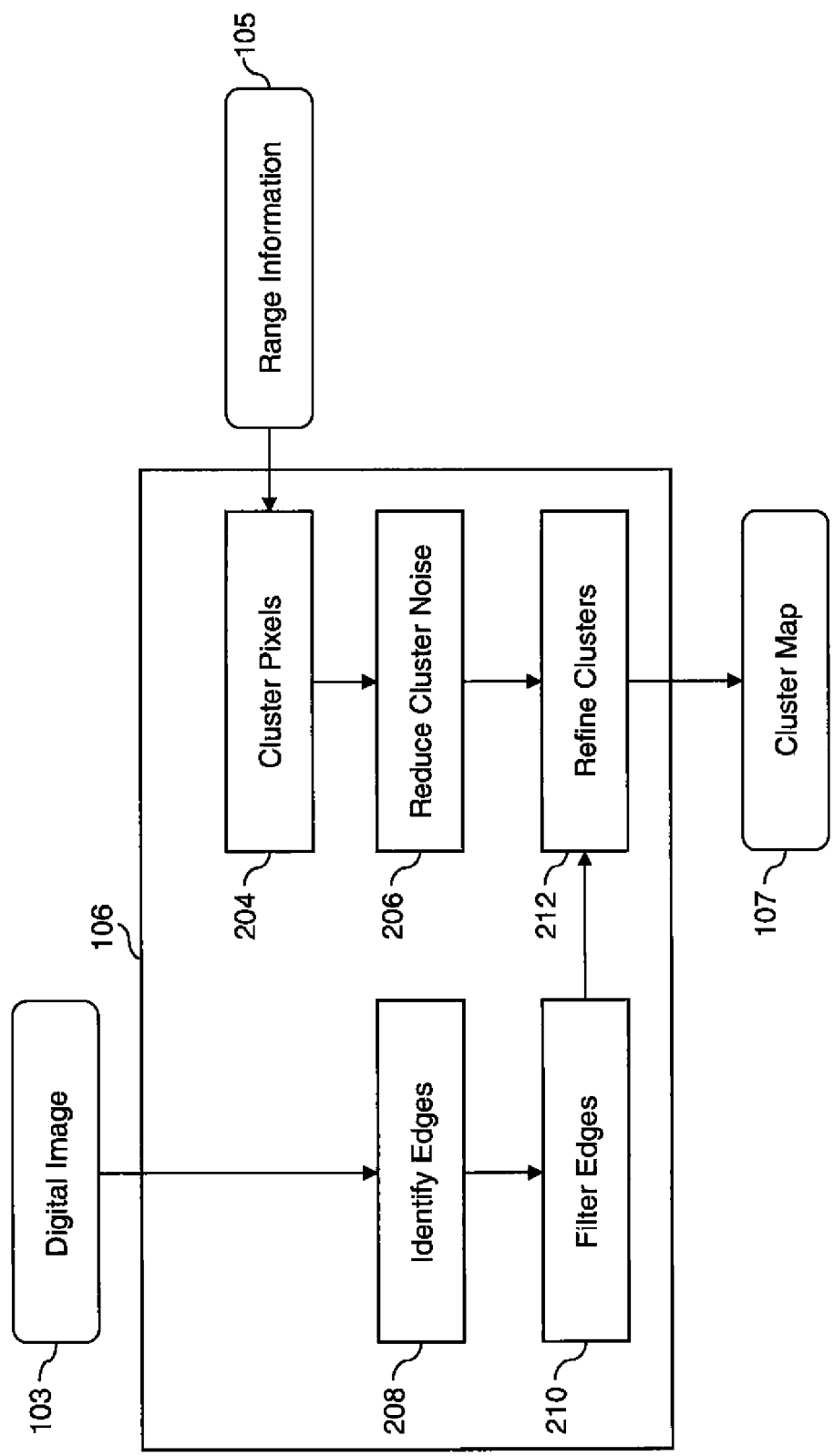
FIG. 3 is a flowchart illustrating additional details for the step of generating a cluster map shown in FIG. 2.

The data processing system 10 includes one or more data processing devices that implement the processes of the various embodiments of the present invention, including the example processes of FIGS. 2 and 3 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 40 includes one or more processor-accessible memories configured to store information, including the information needed to execute the processes of the various embodiments of the present invention, including the example processes of FIGS. 2 and 3 described herein. The data storage system 40 may be a distributed processor-accessible memory system including multiple processor-accessible memories communicatively connected to the data processing system 10 via a plurality of computers and/or devices. On the other hand, the data storage system 40 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include connections between devices or programs within a single data processor, connections between devices or programs located in different data processors, and connections between devices not located in data processors at all. In this regard, although the data storage system 40 is shown separately from the data processing system 10, one skilled in the art will appreciate that the data storage system 40 may be contained completely or partially within the data processing system 10. Further in this regard, although the peripheral system 20 and the user interface system 30 are shown separately from the data processing system 10, one skilled in the art will appreciate that one or both of such systems may be stored completely or partially within the data processing system 10.

The peripheral system 20 may include one or more devices configured to provide digital content records to the data processing system 10. For example, the peripheral system 20 may include digital still cameras, digital video cameras, cellular phones, or other data processors. The data processing system 10, upon receipt of digital content records from a device in the peripheral system 20, may store such digital content records in the data storage system 40.

The user interface system 30 may include a mouse, a keyboard, another computer, or any device or combination of devices from which data is input to the data processing system 10. In this regard, although the peripheral system 20 is shown separately from the user interface system 30, the peripheral system 20 may be included as part of the user interface system 30.

The user interface system 30 also may include a display device, a processor-accessible memory, or any device or combination of devices to which data is output by the data processing system 10. In this regard, if the user interface system 30 includes a processor-accessible memory, such memory may be part of the data storage system 40 even though the user interface system 30 and the data storage system 40 are shown separately in FIG. 1.

FIG. 2 is a flow diagram illustrating a method for detecting objects and background in a digital image, according to an embodiment of the present invention. A digital image 103 representing a scene is received in receive digital image step 102. The digital image 103 can be captured by a digital camera or a scanner. Alternately, it may be a frame of a video sequence captured by a video camera.

Range information 105 associated with the digital image 103 is identified in identify range information step 104. The range information 105 includes distances of pixels in the scene from a known reference location. The viewpoint location needs to identified from the given range information. Usually, the viewpoint location is the reference location. Range information 105 is preferably presented in the form of a range map provided by a ranging camera which uses visible light, inferred light, laser light or ultrasound to determine distances to pixels in the scene. Alternately, the range map can be provided using stereoscopic image techniques that involve capturing images of a scene from multiple viewpoints and determining the range information by evaluating the relative positions of objects in the scene. For cases where the range map has different dimensions (i.e., number of rows and columns) than the digital image 103, the range map is preferably interpolated so that it has the same dimensions.

Next, generate cluster map step 106 is used to generate a cluster map 107 based at least upon an analysis of the range information 105 and the digital image 103. Objects 109 are identified in the digital image using identify objects step 108 based at least upon an analysis of the cluster map 107 and the digital image 103. Background regions are also generally identified as part of identify objects step 108. As part of the identify objects step 108, the identified objects are labeled according to their distances from the viewpoint. In store objects step 110, an indication of the identified objects 109 is stored in a data storage system 40 (FIG. 1). The indication of the identified objects can include, for example, the object label, the position of the object center, a description of the object boundary, and the distance of the object from the viewpoint.

FIG. 3 is a flowchart illustrating additional details for the generate cluster map step 106 shown in FIG. 2, according to an embodiment of the present invention. Digital image 103 and range information 105 comprising a range map are provided as discussed earlier. In cluster pixels step 204, pixels in the range map are clustered by using a clustering algorithm such as the method described in "Dominant Sets and Pairwise Clustering", IEEE Transactions on Pattern Analysis & Machine Intelligence, Volume 29, No. 1, January 2007, pp. 167-172. The cluster groups generated in this manner typically have a lot of noise. Reduce cluster noise step 206 is used to reduce the cluster noise using a morphological method to fill small holes and remove small cluster regions.

Edges are detected in the digital image 103 using an identify edges step 208. In a preferred embodiment of the present invention, the edges are identified using a gradient operation. The gradient of an image is defined as:

$$\nabla I = [G_x, G_y] = \left[\frac{\partial I}{\partial x}, \frac{\partial I}{\partial y}\right]$$

where I(x, y) is the intensity of pixel at location (x, y). The magnitude of the gradient vector is:

$$G=[G_x^2+G_y^2]^{1/2}.$$

Edges are detected in the digital image 103 based on the magnitude of the gradient in each pixel.

Next, filter edges step 210 is used to filter the detected edges to remove insignificant edges and keep the significant edges. Mathematically, the filtering operation can be expressed as:

$$E = f \times e, f = \begin{cases} 0 & \text{if } (S(e) \leq T) \\ 1 & \text{if } (S(e) > T), \end{cases}$$

where e is one of the detected edges, S(e) is the sum of gradient magnitudes of each of the pixels in the edge e, f is a filter mask and T is the threshold.

The pixel clusters produced by the reduce cluster noise step 206 will typically still have errors in the boundary areas because of the noise in the range map. A refine clusters step 212 is used refine the cluster groups and produce cluster map 107. The boundaries of the cluster groups are refined using the significant edges computed in the filter edges step 210. In the filter edges step 210, the detected significant edges are compared to the borders of the cluster groups. If any pixels in a cluster group are outside of the detected significant edges, they will be removed from the cluster group. This will improve the accuracy of cluster group boundaries.

Next, an average distance, n, is computed for each of the refined cluster groups as:

$$n = \frac{1}{m} \sum_{i \in cluster\ w} dis(i),$$

where m is the number of pixels in a cluster group w, and dis(i) is the distance of the $i^{th}$ pixel in the cluster group w to the viewpoint location. The cluster map 107 is generated by assigning the average distance for the cluster group to each pixel in the cluster group.

Figure 4:
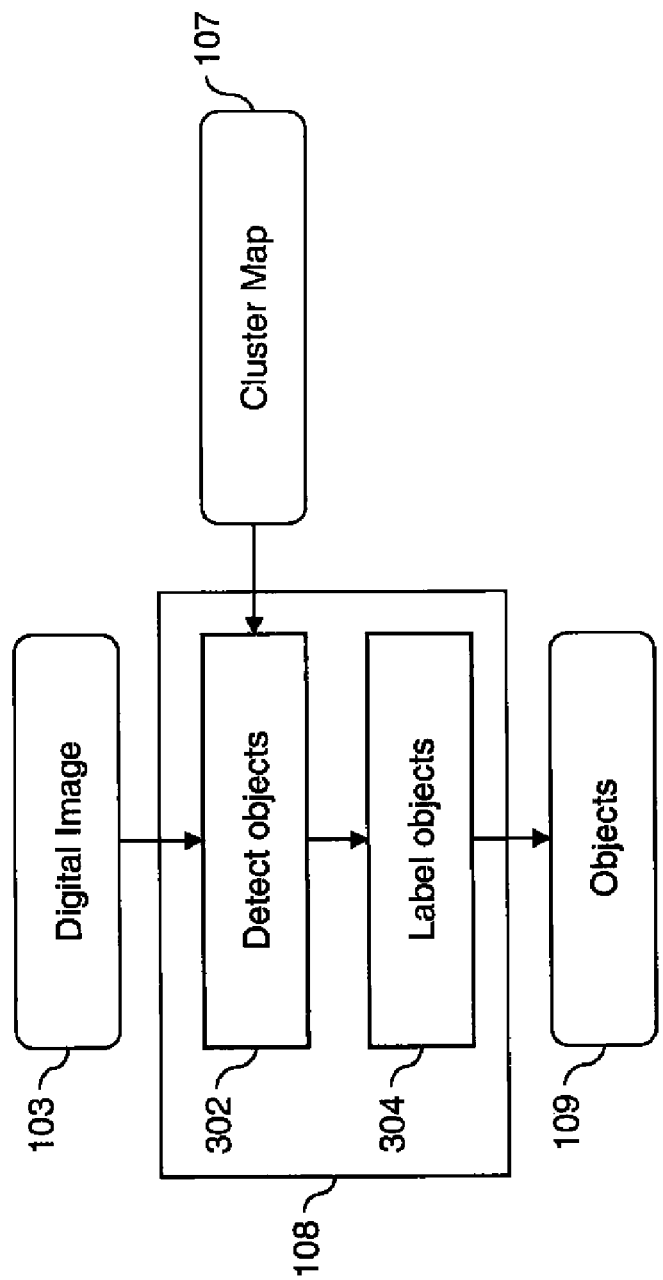
FIG. 4 is a flowchart illustrating additional details for the step of identifying objects in the digital image shown in FIG. 2.

FIG. 4 is a flowchart illustrating additional details for the identify objects step 108 (FIG. 2), according to an embodiment of the present invention. In detect objects step 302, objects and background are detected in the digital image by combining the cluster map 107 and the digital image 103. This step can be expressed mathematically as:

$$objects = f(Cluster\ Map, I)$$

where the function f( ) is an object segmentation operation applied to the digital image I using the cluster map 107. The function f( ) works by identifying pixels in the cluster map 107 having the same distance, then assigning the corresponding pixels in the digital image I to a corresponding object. Alternately, the refined cluster groups can be used directly to segment the image rather than using the cluster map 107 since they contain the same range information. Once the objects in the digital image 103 have been identified, a label objects step 304 is used to label the identified object regions according to their distances from the viewpoint.

By use the exemplary embodiment of the present invention; objects 109 in a digital image 102 can be detected and segmented. The identified objects 109 have utility in numerous image processing methods such as image editing, image relighting, and object recognition.

It is to be understood that the exemplary embodiment(s) is/are merely illustrative of the present invention and that many variations of the above-described embodiment(s) can be devised by one skilled in the art without departing from the scope of the invention. It is therefore intended that all such variations be included within the scope of the following claims and their equivalents.

PARTS LIST

10 Data processing system
20 Peripheral system
30 User interface system
40 Data storage system
102 Receive digital image step
103 Digital image
104 Identify range information step
105 Range information
106 Generate cluster map step
107 Cluster map
108 Identify objects step
109 Objects
110 Store objects step
204 Cluster pixels step
206 Reduce cluster noise step
208 Identify edges step
210 Filter edges step
212 Refine clusters step
302 Detect objects step
304 Label objects step

What is claimed is:

1. A method for detecting objects and background in a digital image, and the method implemented at least in part by a data processing system and comprising the steps of:
   receiving the digital image representing a scene;
   identifying range information associated with the digital image, the range information including distances of pixels in the scene from a known reference location;
   generating a cluster map based at least upon an analysis of the range information using a clustering algorithm, the cluster map grouping pixels of the digital image by their distances from a viewpoint;
   identifying objects in the digital image based at least upon an analysis of the cluster map and the digital image, wherein the analysis of the cluster map and the digital image includes:
      identifying edges in the digital image; and
      refining the pixel groupings in the cluster map by comparing the identified edges with borders of the pixel groupings and removing pixels that are outside of the identified edges from the pixel groupings; and
   storing an indication of the identified objects in a processor-accessible memory system.

2. The method of claim 1, further comprising labeling the identified objects according to their distances from the viewpoint, and storing results of the labeling in a processor-accessible memory system.

3. The method of claim 1, wherein the identified edges undergo a filtering process to remove insignificant edges prior to being compared with the borders of the pixel groupings.

4. The method of claim 1, wherein the range information is received from a ranging camera that senses range information using visible light, inferred light, ultrasound, or laser light.

5. The method of claim 1 wherein the range information is received from a stereoscopic imaging system that determines range information by analyzing a plurality of images of the scene captured from different viewpoints.

6. The method of claim 1, wherein the digital image is captured by a digital camera or a scanner.

7. The method of claim 1, further comprising the step of identifying a viewpoint location.

8. The method of claim 7, wherein the viewpoint location is the reference location.

9. The method of claim 1, wherein the analysis of the cluster map includes the step of reducing noise from the cluster map.

10. The method of claim 9, wherein the reducing of noise from the cluster map fills small holes and removes small clustered regions from the cluster map.

11. A method for detecting objects and background in a digital image, and the method implemented at least in part by a data processing system and comprising the steps of:
   receiving the digital image representing a scene;
   identifying range information associated with the digital image, the range information including distances of pixels in the scene from a known reference location;
   generating a plurality of cluster groups based at least upon an analysis of the range information using a clustering algorithm, the cluster groups representing groupings of pixels in the digital image according to their distances from a viewpoint;
   identifying objects in the digital image based at least upon an analysis of the cluster groups and the digital image, wherein the analysis of the cluster groups and the digital image includes:

identifying edges in the digital image; and refining the cluster groups by comparing the identified edges with borders of the cluster groups and removing pixels that are outside of the identified edges from the cluster groups; and storing an indication of the identified objects in a processor-accessible memory system.

12. A system for detecting objects in a digital image comprising:

a data processing system; and a memory system communicatively connected to the data processing system, the memory system storing instructions configured to cause the data processing system to implement a method for detecting objects in a digital image, wherein the instructions comprise:

receiving the digital image representing a scene;

identifying range information associated with the digital image, the range information including distances of pixels in the scene from a known reference location;

generating a cluster map based at least upon an analysis of the range information using a clustering algorithm, the cluster map grouping pixels of the digital image by their distances from a viewpoint; and identifying objects in the digital image based at least upon an analysis of the cluster map and the digital image, wherein the analysis of the cluster map and the digital image includes:

identifying edges in the digital image; and refining the pixel groupings in the cluster map by comparing the identified edges with borders of the pixel groupings and removing pixels that are outside of the identified edges from the pixel groupings.

13. The system of claim 12, wherein the range information is received from a ranging camera that senses range information using visible light, inferred light, ultrasound, or laser light.

14. The system of claim 12 wherein the range information is received from a stereoscopic imaging system that determines range information by analyzing a plurality of images of the scene captured from different viewpoints.

15. The system of claim 12, wherein the digital image is captured by a digital camera or a scanner.

* * * * *